2,786,627

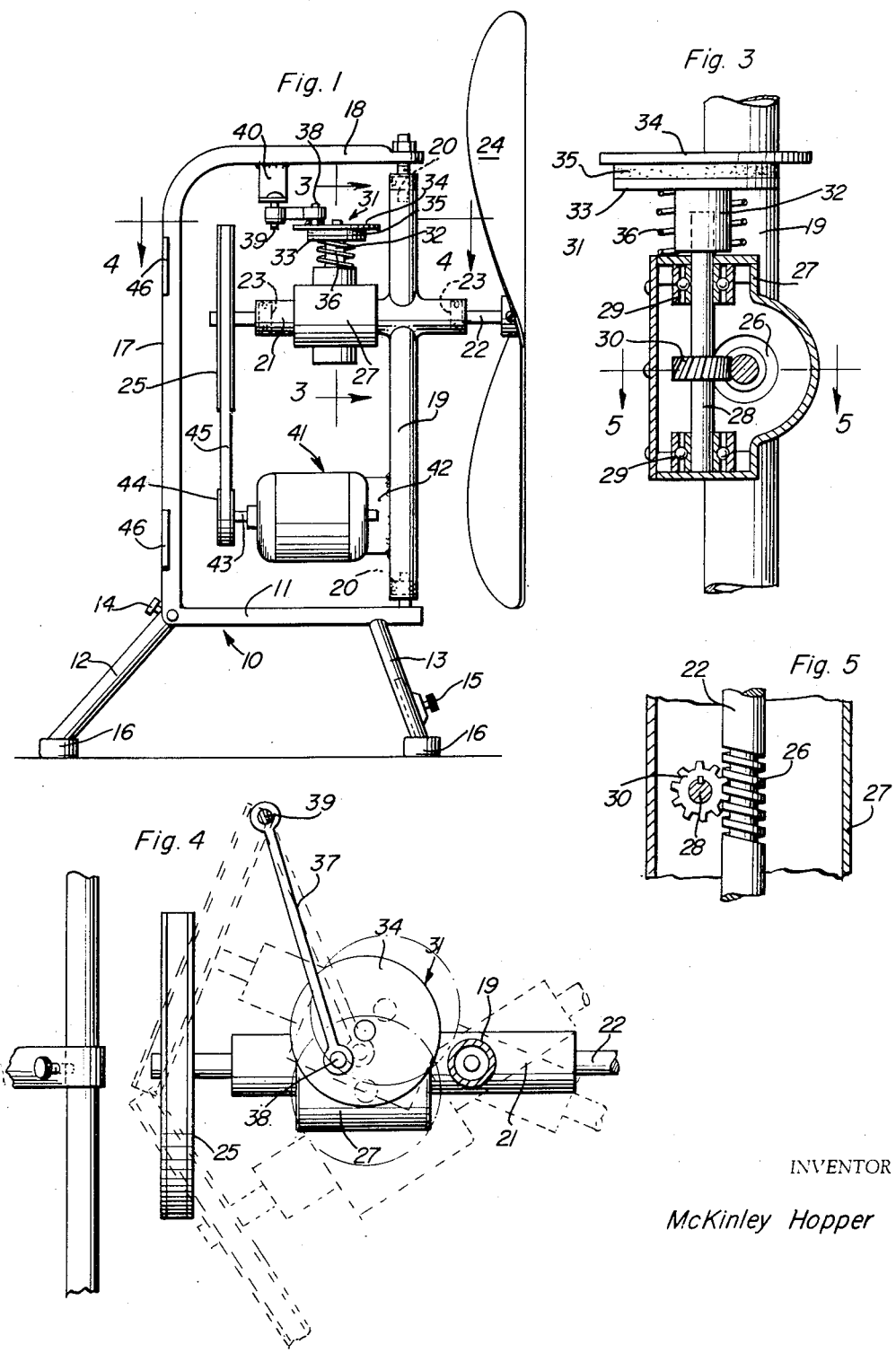

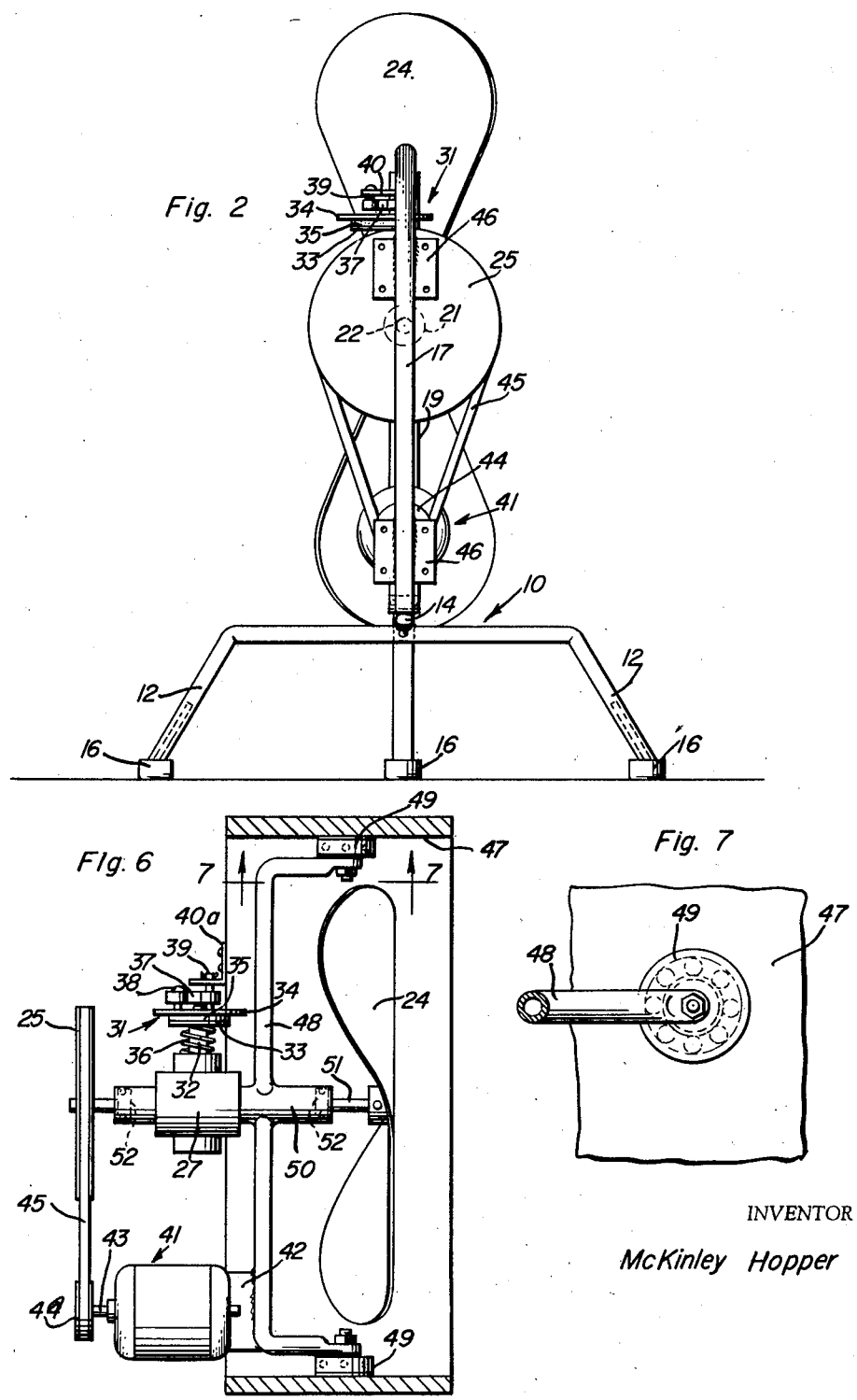

ELECTRIC FAN

McKinley Hopper, Shreveport, La.

Application April 16, 1956, Serial No. 578,525

7 Claims. (Cl. 230—256)

This invention relates to electric fans.

It is an object of the present invention to provide an oscillating electric fan which will pull air from the outside to the inside of the room and will distribute the air over a larger area of floor space which is not reached by suction, attic or window fans of conventional design.

It is another object of the present invention to provide an oscillating electric fan of the above type which is adapted for both floor and window.

It is still another object of the present invention to provide an oscillating electric fan of the above which includes clutch means to prevent the gears from being stripped in the event that the fan oscillation is stopped accidentally.

Other objects of the invention are to provide an oscillating electric fan bearing the above objects in mind which is of simple construction, has a minimum number of parts, is inexpensive to manufacture and efficient in operation.

For other objects and for a better understanding of the invention, reference may be had to the following detailed description taken in connection with the accompanying drawing, in which:

Figure 1 is a side elevational view of a preferred embodiment of the present invention;

Fig. 2 is a rear end elevational view thereof looking from the left of Fig. 1;

Fig. 3 is a vertical sectional view taken along the line 3—3 of Fig. 1;

Fig. 4 is a horizontal sectional view taken along the line 4—4 of Fig. 1;

Fig. 5 is a horizontal sectional view taken along the line 5—5 of Fig. 3;

Fig. 6 is a side view shown partly in elevation and partly in section of a modified form of the present invention; and Fig. 7 is a horizontal sectional view taken along the line 7—7 of Fig. 6.

Referring now more in detail to the drawing and more particularly to Figs. 1 through 5, 10 indicates generally a tripod base member including the horizontal central supporting portion 11 and the tubular supporting legs 12 and 13, the legs 12 and 13 being adjustable by means of the lock screws 14 and 15, respectively and being provided with the rubber feet 16.

The rear end of the horizontal support 11 fixedly carries the standard 17 which is bent forwardly at the upper end thereof and terminates in the horizontal portion 18 vertically spaced and aligned with the horizontal portion 11.

A hollow vertical column 19 is rotatably mounted intermediate the forward ends of the horizontal portions 18 and 11 by means of the ball bearing assemblies 20. The hollow column 19 is integrally formed at right angles thereto with the horizontal hollow cylindrical casing 21 which rotatably mounts therewithin the shaft 22 by means of the self-aligning ball bearing assemblies 23, the shaft 22 extending forwardly and rearwardly beyond the housing 21. The fan 24 is fixedly mounted on the forward end of the shaft 22, while a relatively large pulley 25 is fixedly mounted on the rear end thereof. The shaft 22 rearwardly of the column 19 is formed with the worm 26.

The casing 21 rearwardly of column 19 is integrally formed with the enlarged gear casing 27 which rotatably mounts the vertical shaft 28 (Fig. 3) by means of the self-aligning ball bearings 29, the upper end of the shaft 28 extending upwardly above the gear casing 27. A worm gear 30 is fixedly mounted on the shaft 28 and is in mesh with the worm 26.

A slip clutch assembly indicated generally at 31 is mounted on the upper end of the shaft 28 and includes the cylindrical portion 32 slidably mounted on the upper end of the shaft 28 but prevented against angular displacement relative thereto, the lower plate 3, the upper plate 34, the intermediate friction pad 35 and the coil spring 36 sleeving the cylindrical portion 32 intermediate the upper end of the gear casing 27 and the undersurface of the plate 33. A crank arm 37 is pivotally mounted at one end on the pin 38 fixedly carried off center by the plate 34 and at the other end by means of the pin 39 fixedly carried by the horizontal frame portion 18 by means of the bracket 40.

An electric motor indicated generally at 41 is fixedly mounted on the column 19 below the gear casing 27 by means of the bracket 42 and includes the drive shaft 43 which fixedly carries the relatively small pulley 44, the latter being connected to pulley 25 by means of the belt 45. The motor 41 is supplied with a suitable source of power by means of an electric cord and male plug, not shown, as will be obvious.

A pair of mounting plates 46 are welded or otherwise secured to the vertical standard 17 and may be alternately employed for mounting the device upon a wall, being provided with suitable mounting openings, in which case the legs 12 will be rotated to the undersurface of the horizontal portion 11 when not in use.

In operation, the drive shaft 43 will drive the shaft 22 to operate the fan 24. The rotation of the shaft 22 will in turn rotate the vertical shaft 28 by means of the worm 26 and worm gear 30 which will rotate the plate 34 through the friction clutch or slip clutch assembly 31 and to thereby rotate the device about the column 19 in an oscillating manner, as indicated in outline in Fig. 4. In the event that the oscillation should be stopped, the slip clutch 31 will prevent the stripping of the gear 30 and worm 26.

The above type of fan will cool a larger floor space than a straight blow fan and can be built in any size desired.

Referring now particularly to Figs. 6 and 7, there is shown a modified form of the present invention adapted for windows 47. A U-shaped hollow tubular member 48 is rotatably mounted at its free ends in the center of the window by means of the ball bearings 49 and is integrally formed at its central portion at right angles thereto with the hollow cylindrical casing 50 which rotatably mounts the shaft 51 by means of the ball bearing assemblies 52 which are self-aligning. In this case, one end of the crank arm 37 is pivotally mounted on the pin 39 which is carried by the bracket 49a fixedly connected to the frame 47 at one side thereof.

In other respects the form of the invention shown in Figs. 6 and 7 is the same as that shown in Figs. 1 through 5 and like reference numerals identify like parts throughout the several views. It will be noted that in the modification of Figs. 6 and 7 that the column 48 is offset to allow the fan 24 to remain in the center of the window. Otherwise, the fan would strike the window facing.

While various changes may be made in the detail construction, it shall be understood that such changes shall be within the spirit and scope of the present invention as defined by the appended claims.

What I claim as new and desire to protect by Letters Patent of the United States is:

1. An oscillating electric fan comprising a vertical column, means rotatably mounting said column at the upper and lower ends thereof for rotational movement about a vertical axis, a hollow horizontal casing connected to said vertical column at right angles thereto, a shaft, means rotatably mounting the shaft within said horizontal casing at the opposite ends thereof with the ends of said shaft extending beyond the ends of said casing, a fan fixed to the forward end of said shaft, means for rotating said shaft carried by said column, a gear casing carried by said first casing rearwardly of said column, a second shaft disposed at right angles to said first shaft, means for rotatably mounting said second shaft in said gear casing, a worm gear fixed to said second shaft within said gear casing, a worm carried by said first shaft in mesh with said worm gear, the upper end of said second shaft extending upwardly above said gear casing, slip clutch assembly means mounted on the upper end of said second shaft, a pin fixedly carried by said slip clutch assembly means on the upper surface thereof, a crank arm rotatably mounted at one end on said pin, a fixed bracket mounting a second pin, the other end of said crank arm being rotatably mounted on said second pin whereby to oscillate said column and fan upon rotation of said first shaft and to prevent stripping of worm gear and worm in the event that the oscillation is stopped.

2. An oscillating electric fan according to claim 1, said means for rotating said first shaft comprising a relatively large pulley on the rear end of said first shaft, electric motor means fixedly mounted on said vertical column below said casing and having a drive shaft extending parallel to said first shaft, a relatively small pulley keyed to said drive shaft, and a belt connecting said relatively small and relatively large pulleys.

3. An oscillating electric fan according to claim 2, said means rotatably mounting said first and second shafts comprising self-aligning ball bearing assemblies, said slip clutch means comprising a member slidably mounted on the upper end of said second shaft but prevented against rotational displacement relative thereto, a first-plate carried by the upper end of said member, a friction pad carried by said first plate, and a second plate above said friction pad, and a coil spring sleeving said member intermediate the upper end of said gear casing and the undersurface of said first plate, said pin being fixedly carried by said upper plate.

4. An oscillating electric fan according to claim 3, said means for mounting the upper and lower ends of said vertical column comprising a tripod support having a horizontal portion, a vertical standard fixedly carried by the rear end of said horizontal support and terminating at its upper end in a horizontal forwardly extending portion aligned vertically and freely spaced from said first horizontal portion, and ball bearing assembly means connecting the upper and lower ends of said column to said horizontal portions, said fixed bracket mounting said second pin being secured to said upper horizontal portion.

5. An oscillating electric fan according to claim 4, said tripod support including a forwardly and downwardly extending tubular leg, a second leg telescopically received in the lower end of said tubular leg and terminating in a resilient foot, and set screw means for locking the position of said shaft and tubular members relative to each other, and a U-shaped member terminating in its free ends in resilient feet, said U-shaped member being rotatably mounted on the rear end of said horizontal support and second set screw means for varying the angle of said U-shaped member relative to said horizontal support.

6. An oscillating electric fan according to claim 5, including a pair of vertically spaced brackets secured to said vertical standard and having mounting openings therein for alternately mounting the device on a wall and to permit the collapsing of said U-shaped member onto the undersurface of said horizontal support when not in use.

7. An oscillating electric fan according to claim 3, said means for rotatably mounting said vertical column comprising forwardly extending portions integrally formed at the upper and lower ends of said column, ball bearing assembly means rotatably mounting the forward ends of said forwardly extending portions within a window with said fan in the direct center thereof, said fixed bracket being fixedly carried by the side of the window.

References Cited in the file of this patent

UNITED STATES PATENTS

| | | |
|---|---|---|
| 814,998 | Weiss | Mar. 13, 1906 |
| 1,175,932 | Cryar | Mar. 21, 1916 |
| 1,688,052 | Marsden | Oct. 16, 1928 |
| 1,780,789 | Lanz | Nov. 4, 1930 |
| 2,100,439 | Friedman | Nov. 30, 1937 |
| 2,298,606 | Wren | Oct. 13, 1942 |